US010174866B2

(12) United States Patent
Fowkes et al.

(10) Patent No.: US 10,174,866 B2
(45) Date of Patent: Jan. 8, 2019

(54) APPARATUS AND METHOD FOR SUBSEA LIQUID MIXING AND SAMPLING

(71) Applicant: Subsea 7 Limited, London (GB)

(72) Inventors: Mick Fowkes, Banchory (GB); Paul Booth, Oyne (GB); Dan Quoc Vu, Loughborough (GB); Stewart John Sinclair Munro, Keig (GB); Catriona Rachel Ogg, Cults (GB)

(73) Assignee: Subsea 7 Limited, Sutton (GB)

( * ) Notice: Subject to any disclaimer, the term of this patent is extended or adjusted under 35 U.S.C. 154(b) by 115 days.

(21) Appl. No.: 15/510,234

(22) PCT Filed: Sep. 10, 2015

(86) PCT No.: PCT/GB2015/052620
§ 371 (c)(1),
(2) Date: Mar. 9, 2017

(87) PCT Pub. No.: WO2016/038375
PCT Pub. Date: Mar. 17, 2016

(65) Prior Publication Data
US 2017/0254442 A1    Sep. 7, 2017

(30) Foreign Application Priority Data
Sep. 12, 2014  (GB) .................................. 1416184.8

(51) Int. Cl.
*F16L 1/26*   (2006.01)
*B29B 7/74*   (2006.01)
(Continued)

(52) U.S. Cl.
CPC ................ *F16L 1/26* (2013.01); *B29B 7/748* (2013.01); *B29B 7/7466* (2013.01); *B29B 7/86* (2013.01);
(Continued)

(58) Field of Classification Search
CPC . F16L 1/26; F16L 55/175; F16L 55/18; B29B 7/7466; B29B 7/748; B29B 7/86; B29C 73/025
See application file for complete search history.

(56) References Cited

U.S. PATENT DOCUMENTS 4,426,348 A   1/1984 Salisbury
4,740,110 A   4/1988 Saffrhan
(Continued)

FOREIGN PATENT DOCUMENTS

DE   43 20 848        1/1995
DE   4320848 A1 *     1/1995 ............. B29B 7/748
(Continued)

*Primary Examiner* — Jacob T Minskey
*Assistant Examiner* — Melody Tsui
(74) *Attorney, Agent, or Firm* — Levy & Grandinetti

(57) ABSTRACT

A submersible mixing and sampling apparatus with submersible supply systems (12, 14) for first and second liquid components such as a thermoset resin and a curing agent is disclosed. Each supply system has a respective submersible tank (24) for holding a respective one of the liquid components. Submersible mixers (46, 48, 50) downstream of the supply systems mix the liquid components underwater to form a curable mixture for injection into a subsea chamber such as a tee (102). Submersible sampling devices downstream of the mixers take samples (94) of the mixture underwater before, during and after injection, and optionally also at the surface. The samples may be cured and tested underwater or may be lifted to the surface for testing. The apparatus may be mounted on a subsea skid (100) or basket.

27 Claims, 8 Drawing Sheets

(51) Int. Cl.
    *B29B 7/86*     (2006.01)
    *F16L 55/175*     (2006.01)
    *F16L 55/18*     (2006.01)
    *B29C 73/02*     (2006.01)
    *B29K 63/00*     (2006.01)
    *B29L 23/00*     (2006.01)

(52) U.S. Cl.
    CPC .......... *B29C 73/025* (2013.01); *F16L 55/175* (2013.01); *F16L 55/18* (2013.01); *B29K 2063/00* (2013.01); *B29L 2023/22* (2013.01)

(56) References Cited

U.S. PATENT DOCUMENTS

| | | |
|---|---|---|
| 5,217,146 A | 6/1993 | Neff et al. |
| 2010/0212754 A1 | 8/2010 | Ayers et al. |

FOREIGN PATENT DOCUMENTS

| | | | |
|---|---|---|---|
| DE | 42 45 074 | 1/2007 | |
| GB | 2475982 | 6/2011 | |
| GB | 2476095 | 6/2011 | |
| KR | 2004 0096823 | 11/2004 | |
| WO | WO 2005/114036 | 12/2005 | |
| WO | WO-2005114036 A1 * | 12/2005 | ................ F16L 1/26 |
| WO | WO 2008/021792 | 2/2008 | |
| WO | WO 2011/070354 | 6/2011 | |

\* cited by examiner

APPARATUS AND METHOD FOR SUBSEA LIQUID MIXING AND SAMPLING

This invention relates to a subsea-submersible apparatus for preparing, sampling and injecting fluids such as grouts, and to a method for performing such operations. For the purpose of this specification, 'grout' is exemplified as a settable mixture of liquid epoxy resin and a curing or hardening agent.

The apparatus and method of the invention are primarily designed to prepare and inject grout into equipment and fittings subsea, and are particularly suitable for grouting applications in deep water. Such equipment and fittings include, but are not limited to, repair clamps, pipeline end connectors, couplers, encasing subsea fittings and bandage repairs. However, systems of the invention can be used more generally for other subsea injection or application purposes where two or more components are required to be mixed before injection or application and curing.

It is well known in the subsea oil and gas industry to repair a subsea pipeline in situ underwater by injecting a settable fluid into a clamp chamber that covers the damaged region to be repaired. For example, such a method may be used to repair a coating on a pipeline, where plastics material is injected as a grout into a mould to mitigate damage to the coated pipeline wall. The grout is typically a curable thermoset material.

More generally, the repair of an underwater structure such as a pipeline conventionally involves temporarily or permanently enclosing a damaged area inside a hollow repair fitting such as a clamp or a mould. Installation of a hollow repair fitting on a pipe of a subsea pipeline defines a gap or chamber between the pipe and the fitting. Where such a fitting encircles the pipe, the result is an annular chamber between the outer diameter of the pipe and the inner diameter of the fitting. The chamber is typically purged of water and dried so that repair operations can begin.

In the case of a bandage repair, grout is applied to a material such as Kevlar (trade mark), which is then wrapped around the damaged area.

A subsea repair fitting comprises a sealing system for isolating the chamber within from seawater, hence avoiding ingress of seawater into the chamber or leakage of fluids from the pipeline through the chamber and into the sea. The most common sealing systems comprise seals, packers or inflatable bladders.

Grout may also be injected into a subsea repair fitting to improve leak-tightness and to improve mechanical contact between the fitting and the pipeline. Grout is injected into the sealing system or into the chamber itself. The latter technique is used to repair a coating of a subsea pipeline, where the chamber is used as a mould for the injected grout.

An epoxy grout is preferred for subsea applications because epoxy is easy to handle and to inject as a liquid or low-viscosity product. In addition, epoxy is not sensitive to the cold temperatures that are typical of many subsea applications, especially in deep water.

WO 2011/070354 discloses an example of a clamp that is installed around a damaged region of a subsea pipe to define a chamber between the clamp and the pipe. Once the chamber has been dried, an epoxy grout is injected into the chamber until the damage is sufficiently repaired. The clamp is generally left on the pipeline until a definitive repair can be performed, which may include removing and replacing the damaged section of the pipeline.

As is well known, liquid epoxy resin has to be mixed with a curing or hardening agent to initiate curing and hence hardening of the mixture. The conditions of curing such as hardening time can be controlled to some extent by varying the chemical composition of the curing agent.

Current methods of injecting epoxy grout subsea involve mixing epoxy resin with a curing agent at the surface and transporting the mixed grout via a downline for subsea injection. There are many reasons why this solution is not suitable for use in deeper water.

Firstly, there is a time limit before the mixed grout starts to harden once the resin and hardener components are mixed; clearly, the transit time of grout from the surface to the subsea fitting cannot exceed that limit. Consequently, there is a short working window—usually around forty minutes—in which to transport and inject the epoxy grout. This limits the depth at which subsea grouting can be performed.

Also, a long downline hose necessary for deep water increases the size of the hose reel and winch and requires a stronger hose to bear self-weight and also to resist hydrostatic pressure at depth. Another drawback of a long hose is that a significant volume of grout is needed just to fill the hose before any grout can be expelled from the bottom of the hose into the subsea fitting.

WO 2008/021792 discloses an apparatus and method for hot-tapping a pipeline. One step of the method involves injecting a sealing epoxy grout inside the tapping arrangement. However, the source of epoxy and how it is mixed are neither considered nor described.

Another prior art disclosure, WO 2005/114036, reflects the conventional method for injecting grout that involves mixing an epoxy resin and a curing agent on a surface vessel. Then, the grout mixture is injected into a clamp chamber along a downline hose that extends through the water column between the vessel and the clamp. However, as noted above, such a method can only be used in shallow water. This is because the grout mixture will stop flowing if too much time elapses between mixing and injection, and also because the downline hose could collapse if exposed to high hydrostatic pressure.

A similar method is conventional for grout injection on platform jacket legs, including epoxy grout as described in U.S. Pat. No. 4,740,110. Here, again, the water depth is shallow, typically less than 100 m. Consequently, there is no significant risk of the grout curing before reaching its underwater destination or of the downline hose collapsing under hydrostatic pressure.

KR 2004-0096823 describes an underwater epoxy applicator in which epoxy resin and a curing agent are mixed in a chamber immediately before being applied like a paint by a brush. The applicator is hand-held and so is unsuitable for use in deep water. Also, KR 2004-0096823 discloses nothing to address another challenge of grout injection, namely the requirement for quality control. In conventional subsea grouting applications, quality control is done by sampling the mixed grout at the surface so that the sample can be analysed for composition and for full mixing. The components of the mix may also be sampled separately before mixing, for individual analysis.

Against this background, the invention provides an apparatus for preparing and injecting thermoset material in a subsea environment. Briefly, the apparatus comprises at least one tank for storing a flowable liquid thermoset resin, at least one tank for storing a flowable liquid curing agent or hardener and at least one mixing device for mixing the resin with the curing agent. A fluid circulation means, which may comprise one or more pumps or syringes, is provided to displace appropriate amounts of the resin and the curing agent from the respective tanks to the, or each, mixing device. The mixing device(s) produce a flowable mixed resin such as an epoxy. At least one injection outlet is provided for injecting the flowable mixed resin into a subsea device such as a tee. Piping connects the tanks, the fluid circulation means, the mixing device(s) and the injection outlet(s).

At least one sampling circuit is connected to the piping so that at least one sample of any of the flowable products can be taken subsea. Preferably, therefore, the system is mounted on an underwater skid. The tanks are suitably compensated against hydrostatic pressure or are collapsible. The sampling circuit may be connected to the outlet of each tank and to the outlet of the, or each, mixing device. Samples may be stored on the skid or recovered to the surface independently of the skid.

A flushing circuit is preferably provided to allow flushing of piping and other components of the system with any of the liquid products. The piping and components being flushed may include the mixing device(s) and the sampling circuit. The flushing circuit may end in a drain outlet or empty into a waste tank. A waste tank may also be compensated against hydrostatic pressure or be collapsible.

The invention also provides a method for subsea preparation and injection of a thermoset material into a subsea chamber. The method comprises: storing a liquid thermoset resin in at least one pressure-compensated or collapsible tank; storing a liquid curing agent in at least one pressure-compensated or collapsible tank; and displacing pre-determined amounts of the liquid thermoset resin and the liquid curing agent from the tanks to at least one mixing device. Those liquids are mixed by the mixing device to form a flowable mixed resin. When an outlet of the said the mixing device has been coupled to an inlet of the subsea chamber, the flowable mixed resin is injected into the subsea chamber. Additionally, either of the liquids or the mixed resin are sampled. All of the foregoing operations are performed underwater.

Thus, the subsea-submersible mixing and sampling apparatus of the invention comprises submersible supply systems for first and second liquid components such as a thermoset resin and a curing agent. Each supply system comprises a respective submersible tank for holding a respective one of the liquid components. The submersible tanks of the supply systems are pressure-compensated or collapsible. Submersible mixers downstream of the supply systems mix the liquid components underwater to form a curable mixture for injection into a subsea chamber such as a tee. Submersible sampling devices downstream of the mixers take samples of the mixture underwater before, during and after injection, and optionally also at the surface. The samples may be cured and tested underwater or may be lifted to the surface for testing. The apparatus may be mounted on a subsea skid.

The self-contained system and method of the invention allow for combination and mixing of the resin and hardener to be carried out subsea at the injection site, removing the time constraints associated with mixing grout topside. This feature, coupled with the use of pressure-compensated or collapsible tanks, allows injection to be carried out at any depth.

From one aspect, the invention resides in a subsea-submersible mixing and sampling apparatus, comprising: submersible supply systems for first and second liquid components, each supply system comprising a respective submersible reservoir for holding a respective one of those liquid components, wherein the submersible reservoirs of the submersible supply systems are pressure-compensated or collapsible; at least one submersible mixer downstream of the supply systems for mixing the first and second liquid components to form a mixture for curing; at least one submersible sampling device downstream of the or each mixer for taking a sample of the mixture underwater; and at least one dispensing outlet downstream of at least one of the mixers, such as an injection outlet for injecting the mixture into a subsea chamber to which the injection outlet may be connected in use. The, or each, outlet and a sampling device are on parallel flowpaths downstream of said mixer.

A sampling valve system may be downstream of said mixer, that valve system being operable to direct the mixture selectively along either flowpath to the outlet or said sampling device.

A bypass line may be provided downstream of at least one of the mixers for carrying the mixture past at least one of the sampling devices. In that case, a bypass valve system may be provided downstream of said mixer, which valve system is operable to direct the mixture selectively along a sampling line to the sampling device or along the bypass line to bypass the sampling device.

A sampling device may be provided downstream of a sampling inlet to receive the mixture from a subsea chamber, when that subsea chamber is connected on an upstream side to the injection outlet and on a downstream side to the sampling inlet, that sampling device then being in series with the injection outlet on the same flowpath.

There may be a plurality of mixers on respective parallel flowpaths downstream of the supply systems. In such an arrangement, a switching valve system may be provided upstream of the mixers, which valve system is operable to direct the liquid components selectively to one or more of the mixers. At least one sampling device may be downstream of each mixer of such an arrangement.

The apparatus of the invention may further comprise a supply valve system upstream of the mixers, which valve system is operable to direct only one of the liquid components to a mixer and/or to a sampling device. A submersible slops tank is advantageously provided for receiving the liquid components or the mixture from a mixer and/or from a sampling device.

At least one of the sampling devices may comprise a curing cavity for curing the sample and a closure that is movable to release the cured sample from the curing cavity.

The inventive concept extends to a subsea skid or basket carrying the apparatus of the invention, and to a subsea structure having a chamber coupled to the apparatus of the invention or to the skid or basket of the invention.

The inventive concept also embraces a corresponding method of mixing and sampling liquids underwater. That method comprises: separately supplying liquid components from separate subsea reservoirs underwater, those components being a thermoset resin and a curing agent; mixing the liquid components underwater to form a mixture for curing; providing the mixture to an injection outlet and a sampling device, the injection outlet and the sampling device being on parallel flowpaths; taking a sample of the mixture underwater; and injecting the mixture into a subsea chamber to which the injection outlet is connected. The subsea reservoirs are compensated against hydrostatic pressure; alternatively the subsea reservoirs may be allowed to collapse under hydrostatic pressure.

Advantageously, the sample is cured underwater and may also be tested underwater after curing. In either event, the cured sample may be transported to the surface.

A sample of the mixture may be taken before, during and/or after injecting the mixture into a subsea chamber.

Also, the method of the invention as expressed above may be preceded by supplying and mixing the liquid components above the water surface to form a mixture and taking a sample of the mixture above the water surface. It is also possible to take a sample of either of the liquid components underwater, for example after that component has passed through a mixer.

The liquid components may be switched from one mixer to another mixer between one sampling operation and another sampling operation. Similarly, the mixture or one of the liquid components may be switched from one sampler to another sampler between one sampling operation and another sampling operation.

One of the liquid components may be flushed through a mixer, a sampler or a flowpath that carried the mixture.

An excess of the liquid components or of the mixture is advantageously captured underwater after mixing, sampling or flushing. The captured excess may then be contained while underwater.

In order that the invention may be more readily understood, reference will now be made, by way of example, to the accompanying drawings in which:

FIG. 1 is a schematic diagram of a grouting system of the invention;

FIG. 2 corresponds to FIG. 1 but shows the grouting system mixing resin and hardener and delivering the resulting mixed grout to a sampler at the surface;

FIG. 3 corresponds to FIG. 2 but shows the grouting system delivering mixed grout to a sampler underwater;

FIG. 4 corresponds to FIG. 3 but shows the grouting system delivering mixed grout to a pre-injection sampler before additional mixed grout is injected into a mould cavity;

FIG. 5 corresponds to FIG. 4 but shows the grouting system delivering mixed grout for injection into the mould cavity and from there to a post-injection sampler;

FIG. 6 corresponds to FIG. 4 but shows an injection mixer of the grouting system being flushed with resin without the addition of further hardener;

FIG. 7 corresponds to FIG. 6 but shows the resin being directed through a sampler after flushing the injection mixer;

Figure 1:
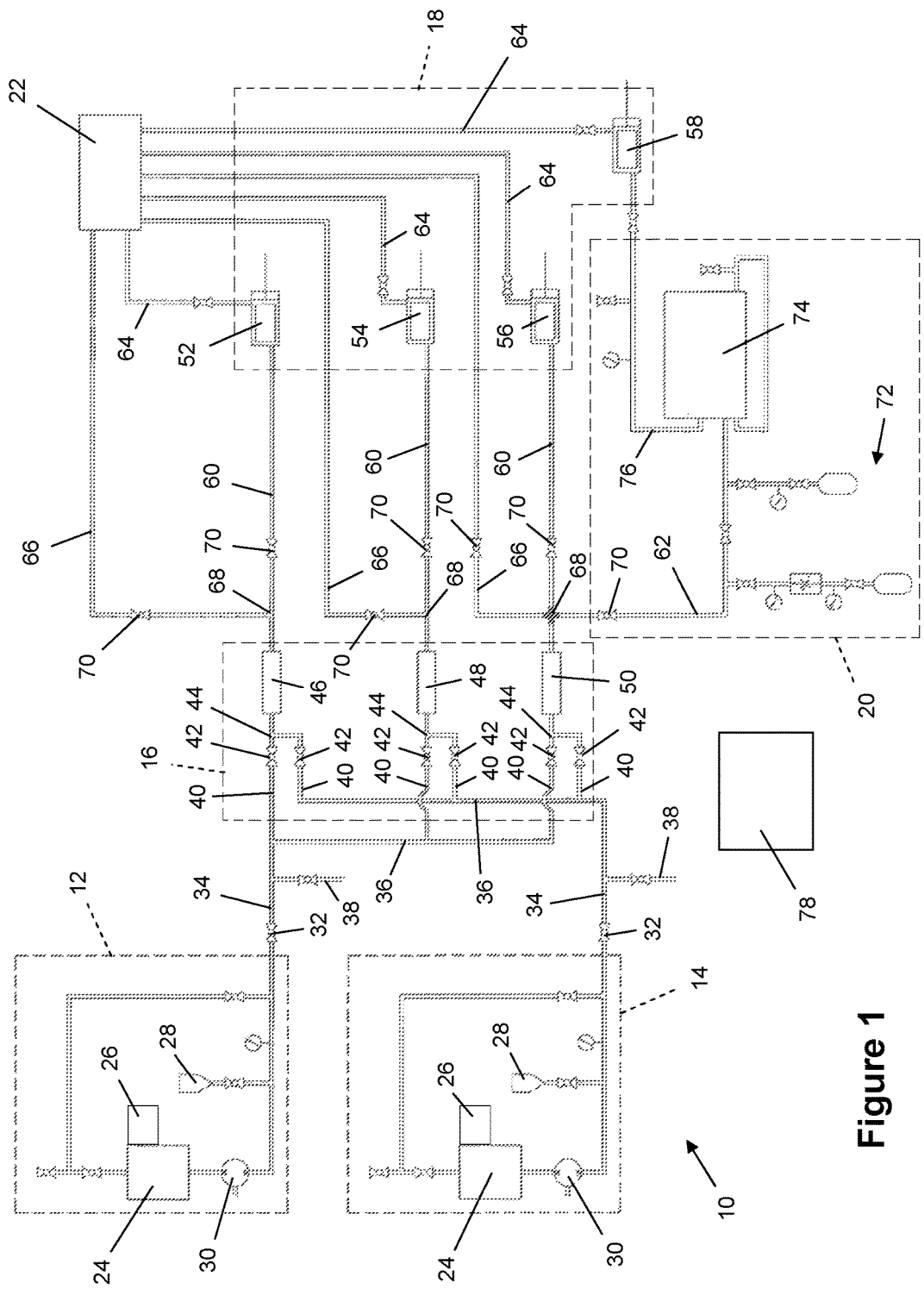

FIGS. 1 to 7 show a subsea grouting system 10 comprising, at an upstream end, a hardener supply system shown generally as 12 and a parallel resin supply system shown generally as 14. A mixing system shown generally as 16 is disposed downstream of the hardener supply system 12 and the resin supply system 14. Hardener and resin may be mixed in the mixing system 16 to form a mixed epoxy grout. A filler may be pre-mixed with both the resin and hardener components of the grout to achieve equal viscosities for ease of mixing.

By operation of various valves as will be explained with reference to FIGS. 2 to 7, the mixing system 16 feeds mixed grout selectively to a testing or sampling system shown generally as 18 and an injection system shown generally as 20.

At a downstream end, the grouting system 10 further comprises a slops tank 22 for receiving hardener, resin or mixed grout, as the case may be, from the mixing system 16 or from the sampling system 18.

The main components of, and the interactions between, the hardener supply system 12, the resin supply system 14, the mixing system 16, the sampling system 18 and the injection system 20 will now be explained in more detail.

The hardener supply system 12 and the resin supply system 14 comprise corresponding components that share reference numerals for convenience. In each case, a reservoir 24 is compensated against hydrostatic pressure by a pressure compensator 26. The pressure compensator 26 may be omitted if the reservoir 24 is designed to be collapsible under hydrostatic pressure. The reservoir 24 is filled with hardener or resin as appropriate via a fill point 28.

The hardener supply system 12 and the resin supply system 14 comprise respective pumps each driven by a hydraulic motor 30. The pumps drive flows of the hardener and resin from the reservoirs 24 through respective supply valves 32, when open, and along respective supply lines 34 to respective manifolds 36 forming part of the mixing section 16.

Valved drains 38 in the supply lines 34 allow the reservoirs 24 to be drained of hardener or resin if needs be, without necessarily directing the hardener or resin through the rest of the system 10.

In this example, each of the manifolds 36 of the mixing section 16 comprises three branches 40. Each branch 40 is fitted with a control valve 42 enabling that branch 40 to be opened or shut down individually. The branches 40 each connect at a junction 44 with a corresponding branch 40 of the other manifold 36. Thus, each branch 40 of a manifold 36 is paired with a counterpart branch 40 of the other manifold 36 and the branches 40 of each pair join at a respective junction 44. It is at these junctions 44 that the hardener and resin start to mix, when allowed to flow along the associated branches 40 by opening their control valves 42.

Each of the three junctions 44 between paired branches 40 of the manifolds 36 is immediately upstream of a respective inline mixer, namely a surface mixer 46, a subsea mixer 48 and an injection mixer 50. The supply lines 34 and the associated manifolds 36 with their branches 40 together form part of respective flowpaths leading from the reservoirs 24 to the mixers 46, 48, 50.

By opening and closing appropriate ones of the valves 32, 42, each pair of branches 40 of the manifolds 36 supplies hardener and/or resin selectively through the associated junction 44 to a respective one of the mixers 46, 48, 50.

The surface mixer 46 is used to mix hardener and resin for sampling mixed grout in the sampling section 18 when the system 10 is at the surface, for example on the deck of an ROV support vessel.

The subsea mixer 48 is used to mix hardener and resin for sampling mixed grout in the sampling section 18 when the system 10 is underwater, most preferably at or near the operational depth at which a grout injection operation will take place.

The injection mixer 50 is used to mix hardener and resin for injecting mixed grout in the injection system 20 and for sampling mixed grout in the sampling section 18 immediately before, during and/or immediately after injection.

Usually, hardener and resin will be supplied together to a mixer 46, 48, 50 for mixing. In that case, all valves 32, 42 in the respective flowpaths leading from the reservoirs 24 to that mixer 46, 48, 50 will be open. These situations will be explained in more detail below with reference to FIGS. 2 to 5. When flushing the system 10, however, hardener or resin alone may be supplied to one or more of the mixers 46, 48, 50. In that case, all valves 32, 42 in the appropriate one of the flowpaths leading from a reservoir 24 to a mixer 46, 48, 50 will be open but at least one valve in the other flowpath leading from the other reservoir 24 to that mixer 46, 48, 50 will be closed. Examples of these situations will also be explained in more detail below, with reference to FIGS. 6 and 7.

The sampling section 18 comprises samplers 52, 54, 56, 58 on parallel flowpaths downstream of the mixers 46, 48, 50 for directly or indirectly receiving and sampling fluid flowing from the mixers 46, 48, 50. The sampled fluid will usually be mixed grout comprising hardener and resin mixed by the mixers 46, 48, 50. However, the sampled fluid could be hardener or resin alone, which may be driven through a mixer 46, 48, 50 when flushing the system 10 as noted above.

Specifically, a surface sampler 52 is downstream of the surface mixer 46 and communicates with the surface mixer 46 through a sampling line 60. Similarly, a subsea sampler 54 is downstream of the subsea mixer 48 and communicates with the subsea mixer 48 through a parallel sampling line 60.

Injection samplers, namely a pre-injection sampler 56 and a post-injection sampler 58 are on parallel flowpaths downstream of the injection mixer 50. The pre-injection sampler 56 is downstream of the injection mixer 50 and communicates with the injection mixer 50 through a further sampling line 60.

The injection system 20 is also downstream of the injection mixer 50, on a flowpath that is parallel with the flowpath of the pre-injection sampler 56. The injection system 20 communicates with the injection mixer 50 through an injection line 62 that branches from the sampling line 60 leading to the pre-injection sampler 56. The post-injection sampler 58 is downstream of the injection system 20, in series on the same flowpath. Consequently, the post-injection sampler 58 receives fluid flowing from the injection mixer 50 only after that fluid has passed through the injection system 20.

Fluid will also flow out of the samplers 52, 54, 56, 58 in use, namely excess mixed grout or hardener or resin used in flushing the system 10. That outflowing fluid is channelled to the slops tank 22 via valved outlet lines 64. Also, fluid flowing from the mixers 46, 48, 50 need not always be sampled by the samplers 52, 54, 56, 58 or consumed by the injection system 20. Consequently, bypass lines 66 branch off from the sampling lines 60 at junctions 68 downstream of each mixer 46, 48, 50 and upstream of the samplers 52, 54, 56 and the injection system 20. The bypass lines 66 also lead to the slops tank 22, providing an option for fluid flowing from the mixers 46, 48, 50 to bypass the samplers 52, 54, 56, 58 and the injection system 20.

In this example, the junction 68 downstream of the injection mixer 50 is also where the injection line 62 leading to the injection system 20 branches from the sampling line 60 leading to the pre-injection sampler 56.

Valves 70 in the sampling lines 60, the injection line 62 and the bypass lines 66 may be opened and closed, preferably in toggled relation, to divert fluid flow from each mixer 46, 48, 50 selectively along any desired one of those lines 60, 62, 66.

Figures 8A, 8B, 8C, 9:
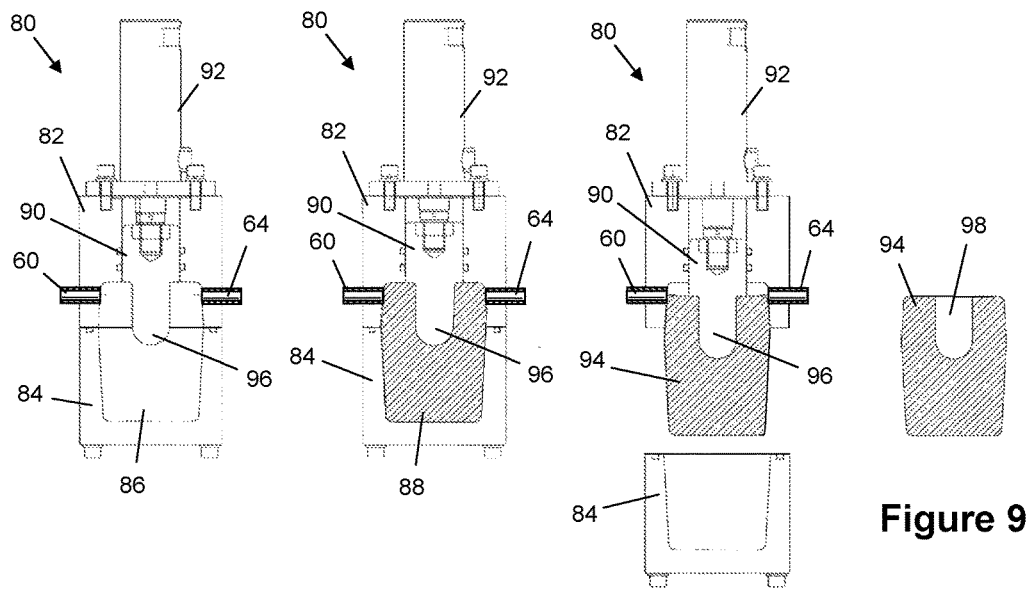
FIGS. 8a to 8c are a series of sectional side views of a sampling mould that may be used in the system of the invention.
FIG. 9 is a sectional side view of a moulded sample produced by the sampling mould shown in FIGS. 8a to 8c.

The injection system 20 further includes a depth-compensated pressurising and drying system shown generally at 72 and a mould cavity 74 such as may be defined by a tee as shown in FIG. 9. A valved sampling line 76 leads from the mould cavity 74 to the post-injection sampler 58.

A control unit 78 controls and coordinates the operation of the system 10, in particular; the motors 30; all valves including the valves 32, 42, 70; the mixers 46, 48, 50; and the samplers 52, 54, 56, 58.

FIGS. 2 to 5 of the drawings show how operation of the valves 32, 42, 70 allows the mixing system 16 to mix hardener and resin and to feed the resulting mixed grout selectively to chosen samplers 52, 54, 56 of the sampling system 18 and/or to the injection system 20. Thus, in all of FIGS. 2 to 5, the supply valves 32 leading from the hardener supply system 12 and the resin supply system 14 are both open and the motors 30 are both activated to pump hardener and resin along the respective supply lines 34 to respective manifolds 36.

Figure 2:
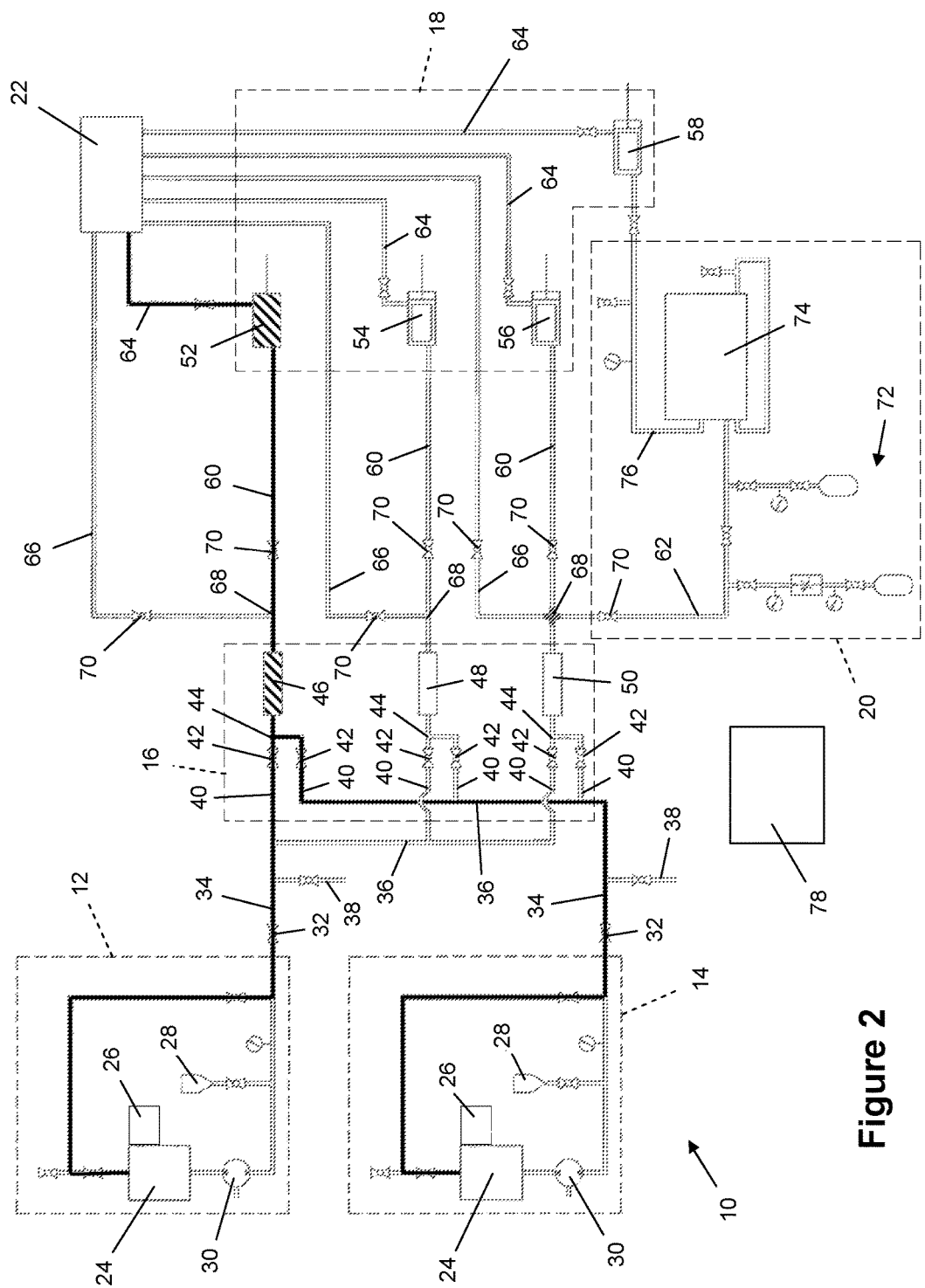

In FIG. 2, the system 10 is shown taking a sample of mixed grout when at the surface. Consequently, the control valves 42 of the paired branches 40 leading to the surface mixer 46 are open so that hardener and resin flow through the associated junction 44 to the surface mixer 46. The surface mixer 46 is activated to mix the hardener and resin before injecting the resulting mixed grout into the surface sampler 52 via the sampling line 60. The valve 70 in that sampling line 60 is open but the valve 70 in the associated bypass line 68 is closed. The outlet line 64 associated with the surface sampler 52 carries excess mixed grout into the slops tank 22. The control valves 42 of the paired branches 40 leading to the other mixers 48, 50 are closed and those other mixers 48, 50 are deactivated.

Figure 3:
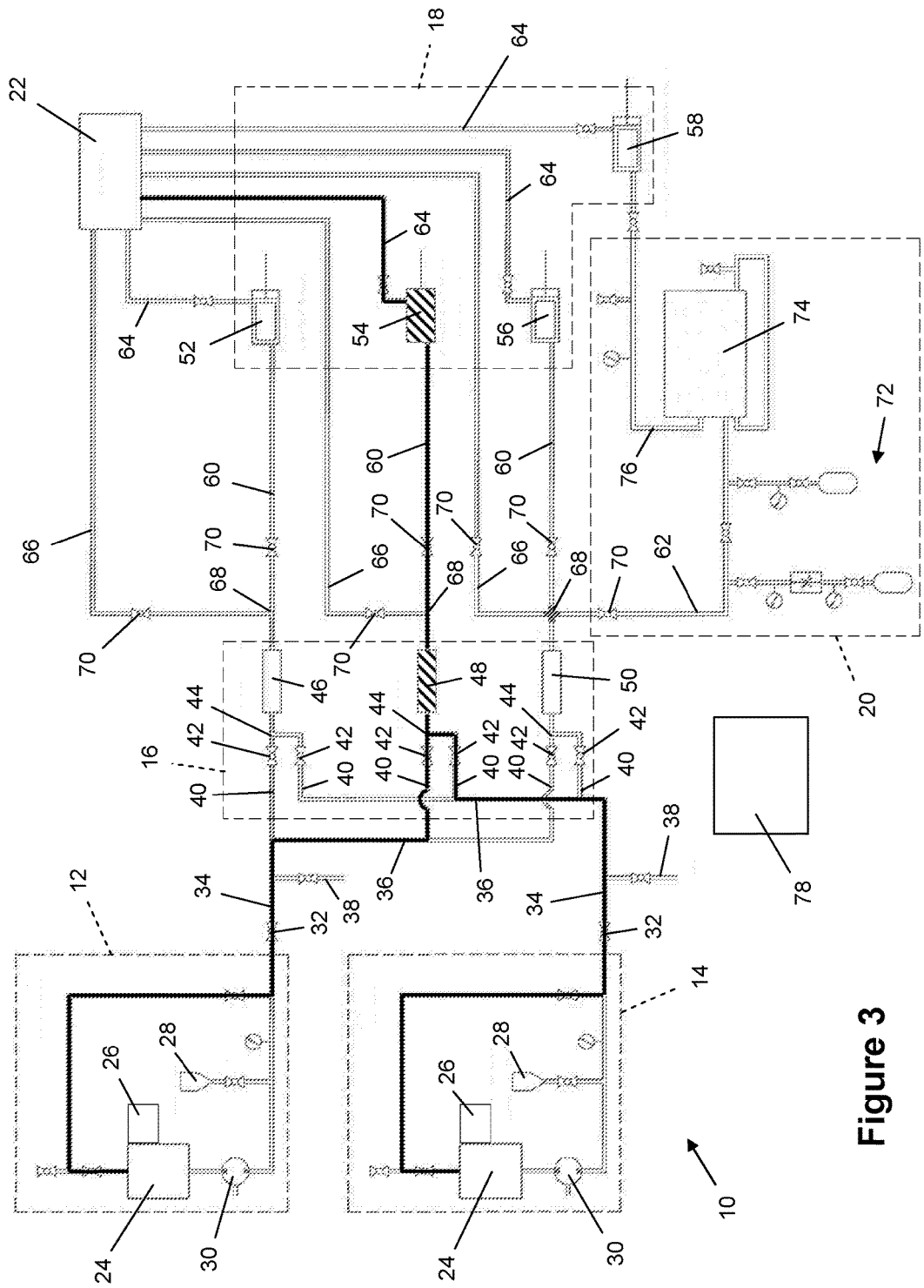

In FIG. 3, the system 10 is shown taking a sample of mixed grout when underwater. Consequently, the control valves 42 of the paired branches 40 leading to the subsea mixer 48 are open so that hardener and resin flow through the associated junction 44 to the subsea mixer 48. The control valves 42 of the paired branches 40 leading to the other mixers 46, 50 are closed and those other mixers 46, 50 remain deactivated.

The subsea mixer 48 is activated to mix the hardener and resin before injecting the resulting mixed grout into the subsea sampler 54 via the sampling line 60. The valve 70 in that sampling line 60 is open but the valve 70 in the associated bypass line 66 is closed. The outlet line 64 associated with the subsea sampler 54 carries excess mixed grout from that sampler 54 into the slops tank 22.

Figure 4:
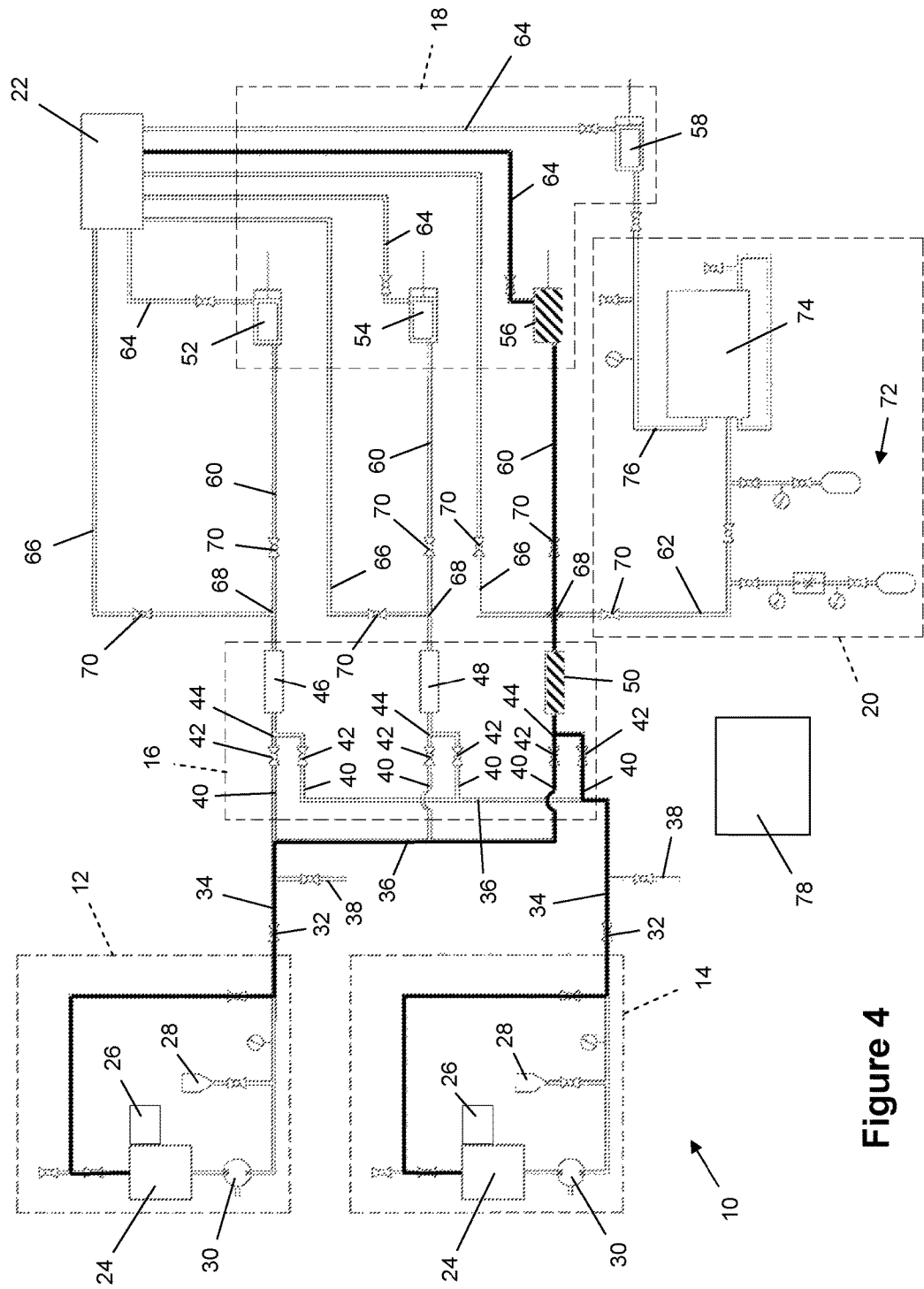

In FIG. 4, the system 10 is shown taking a sample of mixed grout when underwater, just before injection into the mould cavity 74. Consequently, the control valves 42 of the paired branches 40 leading to the injection mixer 50 are open so that hardener and resin flow through the associated junction 44 to the injection mixer 50. The control valves 42 of the paired branches 40 leading to the other mixers 46, 48 are closed and those other mixers 46, 48 remain deactivated.

The injection mixer 50 is activated to mix the hardener and resin before injecting the resulting mixed grout into the pre-injection sampler 56 via the sampling line 60. The valve 70 in that sampling line 60 is open but the valves 70 in the associated bypass line 66 and the injection line 62 are closed. The outlet line 64 associated with the pre-injection sampler 56 carries excess mixed grout from that sampler 56 into the slops tank 22.

Figure 5:
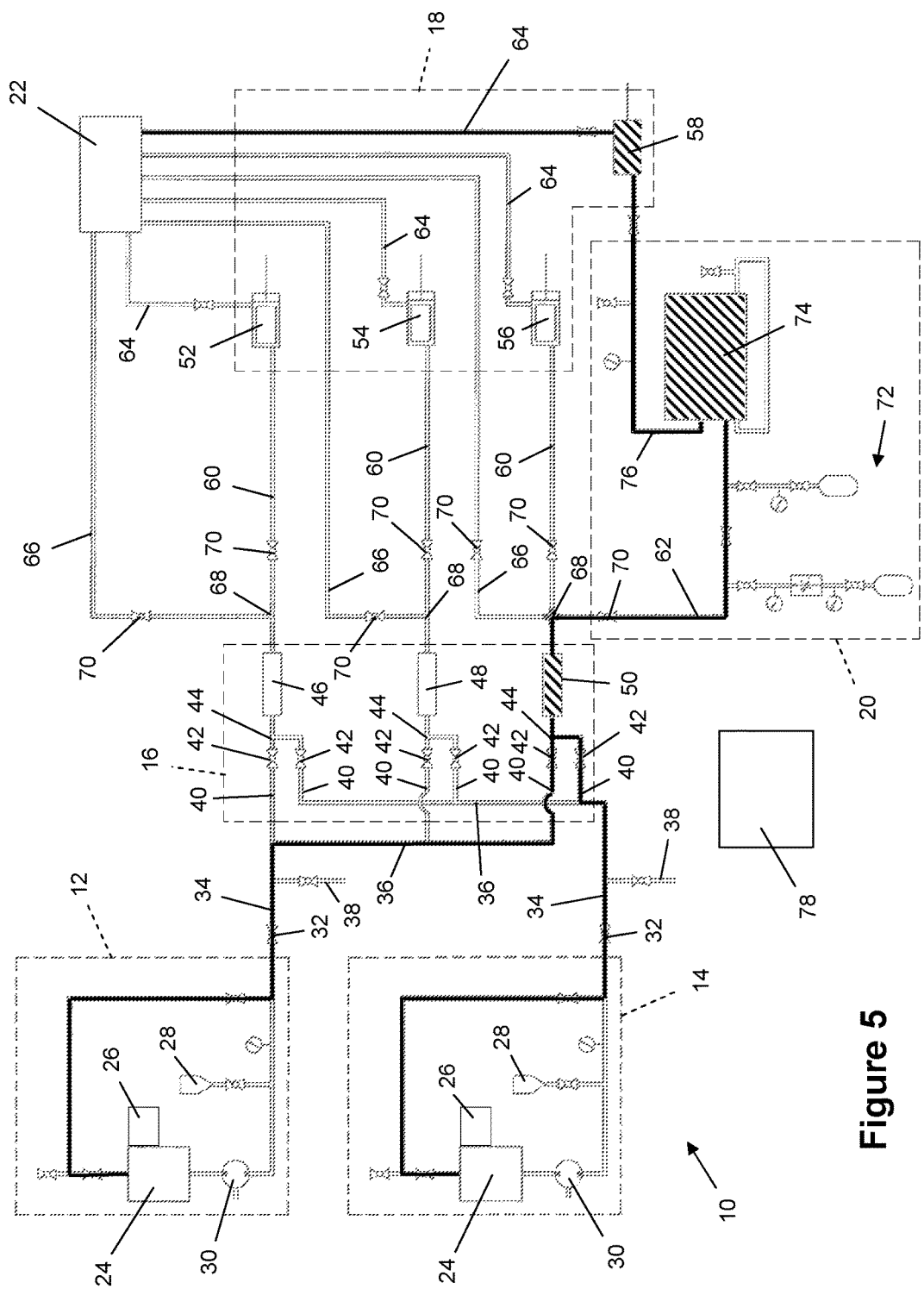

In FIG. 5, the system 10 is shown injecting mixed grout into the mould cavity 74 underwater and taking a sample of the mixed grout immediately after injection. Consequently, the control valves 42 of the paired branches 40 leading to the injection mixer 50 are open so that hardener and resin flow through the associated junction 44 to the injection mixer 50. Again, the control valves 42 of the paired branches 40 leading to the other mixers 46, 48 are closed and those other mixers 46, 48 remain deactivated.

The injection mixer 50 is activated to mix the hardener and resin before injecting the resulting mixed grout into the mould cavity 74 via the injection line 62. For this purpose, the valve 70 in the injection line 62 is open but the valves 70 in the associated sampling line 60 and bypass line 66 are closed. After filling and flowing through the mould cavity 74, mixed grout is fed into the post-injection sampler 58 via the sampling line 76. The outlet line 64 associated with the post-injection sampler 58 carries excess mixed grout from that sampler 58 into the slops tank 22.

Figure 6:
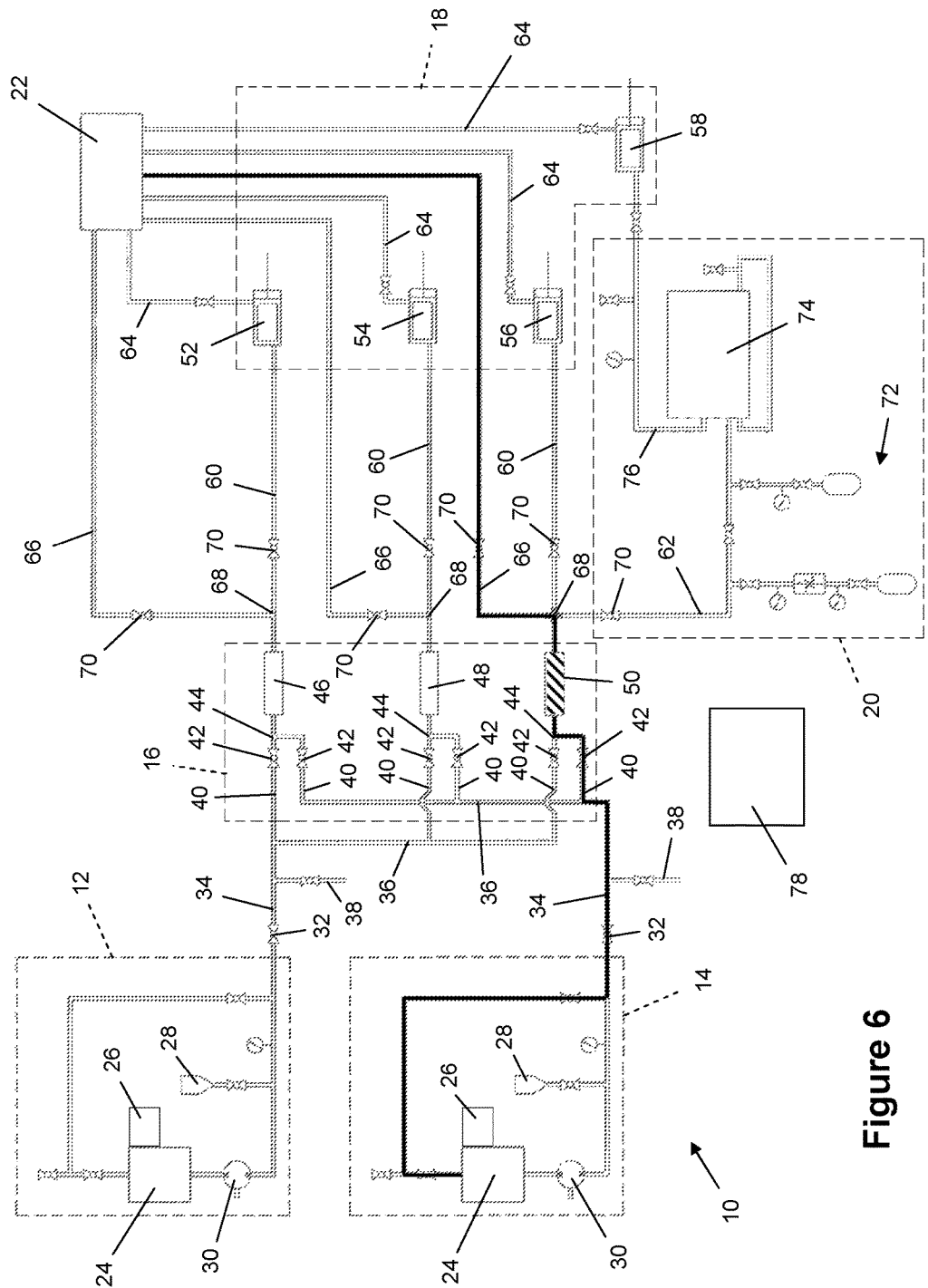
Figure 7:
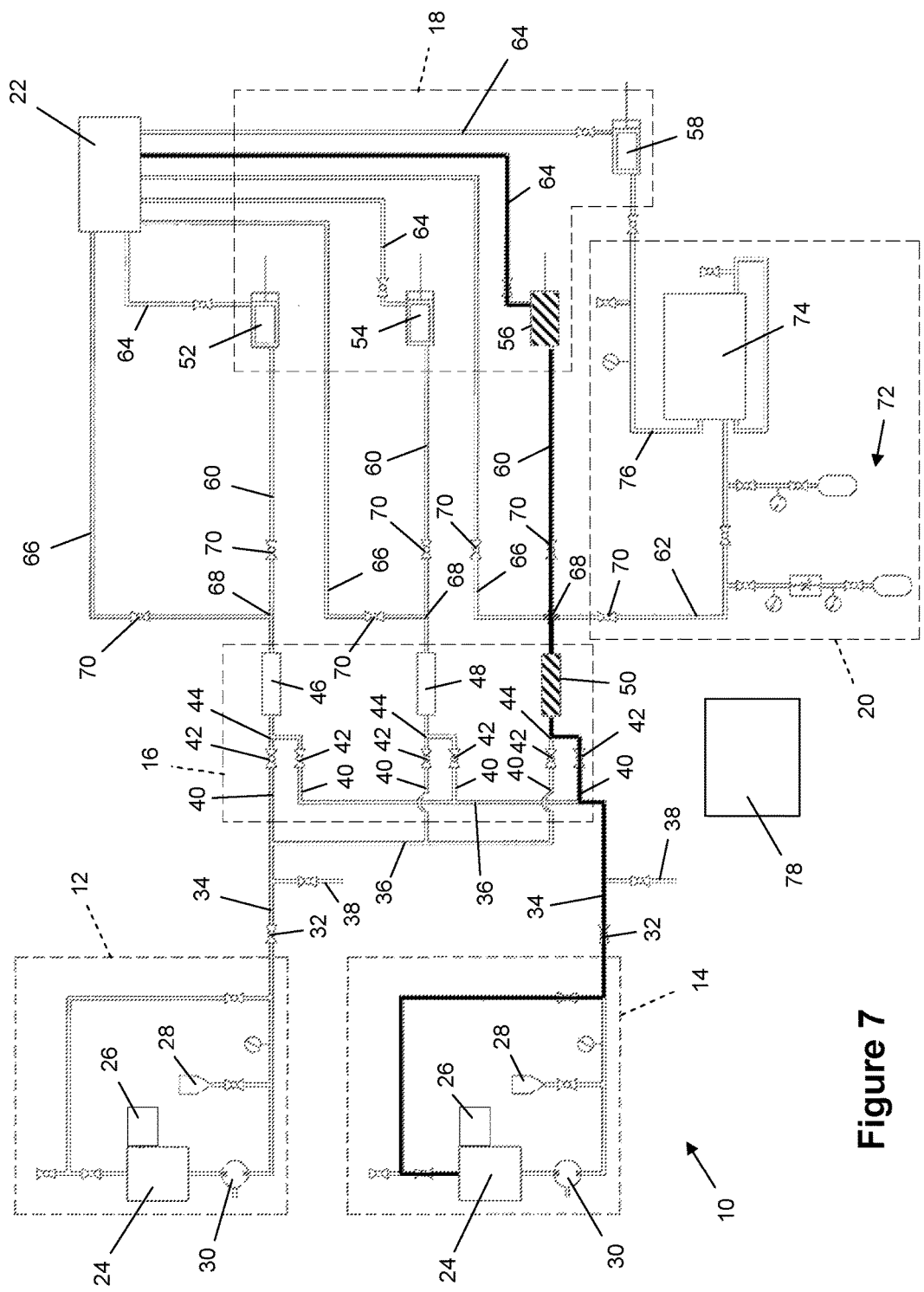

FIGS. 6 and 7 of the drawings exemplify how the motors 30 and the valves 32, 42, 70 can be operated to feed only hardener or resin through components of the grouting system 10 for flushing and for sampling or other testing of the hardener or resin. In these examples, only resin is used for flushing and only resin is sampled. Also, only the injection mixer 50 is being flushed. However, it will be clear how the motors 30 and valves 32, 42, 70 could be operated to feed only hardener for flushing and sampling, or to flush either of the other mixers 46, 48 or other flowpaths of the system 10.

In FIGS. 6 and 7, the supply valve 32 leading from the hardener supply system 12 is closed and the motor 30 of the hardener supply system 12 is deactivated as no hardener is being supplied. Conversely, the supply valve 32 leading from the resin supply system 14 is open and the motor 30 of the resin supply system 14 is activated to pump resin through the associated supply line 34 and manifold 36.

The control valve 42 of the branch 40 of the manifold 36 leading to the injection mixer 50 is open so that resin flows through the associated junction 44 to the injection mixer 50. The control valve 42 of the paired branch 40 of the other manifold 36 leading from the hardener supply system 12 remains closed.

In FIG. 6, resin flowing from the injection mixer 50 after flushing is discarded directly into the slops tank 22 by opening the valve 70 in the bypass line 66 downstream of the injection mixer 50. The valves 70 of the sampling line 60 and the injection line 62 also downstream of the injection mixer 50 remain closed.

In FIG. 7, resin flowing from the injection mixer 50 after flushing is sampled or otherwise tested before being discarded into the slops tank 22. To this end, the valve 70 in the sampling line 60 downstream of the injection mixer 50 is opened, while the valves 70 of the bypass line 66 and the injection line 62 also downstream of the injection mixer 50 remain closed. In this way, resin flowing from the injection mixer 50 is directed along the sampling line 60 and into the pre-injection sampler 56 before flowing into the slops tank 22 via the associated outlet line 64.

The provisions of the system 10 for flushing allow either resin or hardener to be flushed through pipework and other components that contains mixed grout. Flushing may be performed subsea and so allows for multiple grouting operations to be undertaken during the same dive.

FIGS. 8a, 8b and 8c show a sampling mould 80 that is suitable for use in the samplers 52, 54, 56, 58 shown in FIGS. 1 to 7, when sampling mixed grout. The sampling mould 80 comprises a body 82 and a cup-like closure 84 that is removably attached to the body 82 to define a mould cavity 86 between them.

FIGS. 8a and 8b show the closure 84 sealed to the body 82 to enclose the mould cavity 86, which is shown empty in FIG. 8a and full of mixed grout 88 in FIG. 8b. The mixed grout 88 is introduced into the mould cavity 86 through a sampling line 60 as shown in FIGS. 1 to 7. As the mould cavity 86 fills, excess mixed grout 88 flows out of the mould cavity 86 through an outlet line 64 that leads to the slops tank 22 as also shown in FIGS. 1 to 7.

The body 82 supports a plunger 90 that is driven relative to the body 82 by an actuator 92 to reciprocate between a retracted position shown in FIGS. 8a and 8b and an extended position shown in FIG. 8c. In FIG. 8c, the mixed grout 88 has cured and hardened into a sample 94 and the closure 84 has been removed from the body 82 to allow the sample 84 to be demoulded with the assistance of the extended plunger 90.

The sample 94 is shown in isolation in FIG. 9. It will be noted that a spigot 96 projecting into the mould cavity 86 from the plunger 90 defines and engages a recess 98 in the sample 94. This engagement conveniently holds the sample 94 until the sample 94 is pulled off the spigot 96.

The provisions of the system 10 for epoxy grout sampling allow for mixed grout samples 94 to be taken at various stages of the grout injection process. Sampling carried out at the surface and subsea before grout injection ensure that the grout is fully mixed, while pre- and post-injection samples provide quality assurance. For example, pre- and/or post-injection samples taken in tandem with injection serve as an as-built sample of the grout for strength tests if required. The samples 94 can be analysed subsea or recovered to the surface for analysis.

Figure 10:
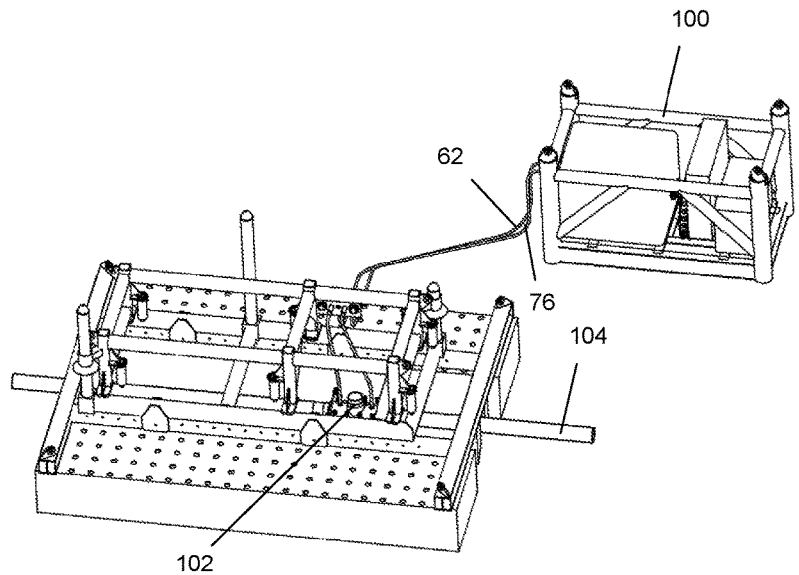
FIG. 10 is a perspective view of a submersible skid for implementing the system of the invention, coupled to a tee on a subsea pipeline.

Turning finally to FIG. 10, this shows a subsea skid 100 that implements the system 10 of the invention. The skid 100 is shown here coupled to a tee 102 on a subsea pipeline 104 for the purpose of grouting the tee 102 and lying on the seabed beside the pipeline 104. The skid 100 carries the components of the system 10 on-board with the exception of the mould cavity 74, which in this example is defined by the tee 102.

The injection line 62 and the sampling line 76 are visible in FIG. 10 extending between the skid 100 and the tee 102, serving as parts of an injection interface connection. Releasable ROV-operable couplings are suitably provided between the injection line 62, the sampling line 76 and the skid 100 and/or the tee 102.

The skid 100 may be deployed by an ROV, winch or crane and may be powered by an ROV or via an umbilical connection from the surface. The skid 100 may include a facility for analysing a sample 94 subsea, for example by strength-testing the sample 94. Samples 94 may be stored on the skid 100 for recovery to the surface with the skid 100 for subsequent analysis. Alternatively, samples 94 may be taken from the skid 100 subsea, for example using a grabber of an ROV, and lifted to the surface by that ROV or by a winched basket or other device into which the ROV deposits the sample.

Many other variations are possible within the inventive concept. For example, the epoxy components may be pumped into a mixer or sampler using syringes instead of pumps. Also, it would be possible for the same mixer or sampler to be used at more than one stage in the process to allow the number of mixers and samplers to be reduced. For example, a single mixer could be used both at the surface and subsea and could feed mixed grout to a single sampler both at the surface and subsea if the mixer and the sampler are flushed between those operations. Interim flushing may also allow the same mixer and sampler to be used for mixing and sampling before, during and after injection of mixed grout.

Testing a hardener, resin or mixed grout does not necessarily involve sampling as it may be possible to determine certain characteristics of such fluids, such as viscosity, when the fluids are in the various flowpaths of the system.

Sampling or otherwise testing the hardener or resin could be performed underwater without first directing the hardener or resin through a mixer. In that case, one or more samplers or other testing units could be connected directly to the hardener supply system and/or to the resin supply system, for example using one or more valved bypass lines that bypass the mixers selectively.

The invention claimed is:

1. A subsea-submersible mixing and sampling apparatus, comprising:
    submersible supply systems for first and second liquid components, each supply system comprising a respective submersible reservoir for holding a respective one of those liquid components, wherein the submersible reservoirs of the submersible supply systems are pressure-compensated or collapsible;
    at least one submersible mixer downstream of the supply systems for mixing the first and second liquid components to form a mixture for curing;
    at least one submersible sampling device downstream of the or each mixer for taking a sample of the mixture underwater; and
    at least one injection outlet downstream of at least one of the mixers for injecting the mixture into a subsea chamber to which the injection outlet may be connected in use, wherein the injection outlet and a sampling device are on parallel flowpaths downstream of said mixer.

2. The apparatus of claim 1, further comprising a sampling valve system downstream of said mixer, which valve system is operable to direct the mixture selectively along either flowpath to the injection outlet or said sampling device.

3. The apparatus of claim 1, further comprising a bypass line downstream of at least one of the mixers for carrying the mixture past at least one of the sampling devices.

4. The apparatus of claim 3, further comprising a bypass valve system downstream of said mixer, which valve system is operable to direct the mixture selectively along a sampling line to the sampling device or along the bypass line to bypass the sampling device.

5. The apparatus of claim 1, comprising a plurality of mixers on respective parallel flowpaths downstream of the supply systems.

6. The apparatus of claim 5, further comprising a switching valve system upstream of the mixers, which valve system is operable to direct the liquid components selectively to one or more of the mixers.

7. The apparatus of claim 5, wherein at least one sampling device is downstream of each mixer.

8. The apparatus of claim 1, further comprising a supply valve system upstream of the mixers, which valve system is operable to direct only one of the liquid components to a mixer and/or to a sampling device.

9. The apparatus of claim 1, further comprising a submersible slops tank for receiving the liquid components or the mixture from a mixer and/or from a sampling device.

10. The apparatus of claim 1, wherein at least one of the sampling devices comprises a curing cavity for curing the sample and a closure that is movable to release the cured sample from the curing cavity.

11. A subsea skid or basket carrying the apparatus of claim 1.

12. A subsea structure having a chamber coupled to the skid or basket of claim 11.

13. The subsea structure of claim 12, wherein the subsea chamber is connected on an upstream side to the injection outlet and on a downstream side to a sampling inlet; a sampling device is downstream of the sampling inlet to receive the mixture from the subsea chamber; and the sampling device is in series with the injection outlet on the same flowpath.

14. A method of mixing and sampling liquids underwater, comprising:
    separately supplying liquid components from separate subsea reservoirs underwater, those components being a thermoset resin and a curing agent;
    mixing the liquid components underwater to form a mixture for curing;
    providing the mixture to an injection outlet and a sampling device, the injection outlet and the sampling device being on parallel flowpaths;
    taking a sample of the mixture underwater; and
    injecting the mixture into a subsea chamber to which the injection outlet is connected,
    wherein the method comprises compensating the subsea reservoirs against hydrostatic pressure or allowing the subsea reservoirs to collapse under hydrostatic pressure.

15. The method of claim 14, comprising curing the sample underwater.

16. The method of claim 15, comprising testing the cured sample underwater.

17. The method of claim 15, comprising transporting the cured sample to the surface.

18. The method of claim 14, comprising taking a sample of the mixture before, during and/or after injecting the mixture into a subsea chamber.

19. The method of claim 14, preceded by supplying and mixing the liquid components above the water surface to form a mixture and taking a sample of the mixture above the water surface.

20. The method of claim 18, comprising switching the liquid components from one mixer to another mixer between one sampling operation and another sampling operation.

21. The method of claim 14, comprising taking a sample of either of the liquid components underwater.

22. The method of claim 21, comprising taking a sample of a liquid component after that component has passed through a mixer.

23. The method of claim 18, comprising switching the mixture or one of the liquid components from one sampler to another sampler between one sampling operation and another sampling operation.

24. The method of claim 14, comprising flushing one of the liquid components through a mixer, a sampler or a flowpath that carried the mixture.

25. The method of claim 14, comprising capturing an excess of the liquid components or of the mixture underwater after mixing, sampling or flushing and containing that captured excess while underwater.

26. A subsea structure having a chamber coupled to the apparatus of claim 1.

27. The subsea structure of claim 26, wherein the subsea chamber is connected on an upstream side to the injection outlet and on a downstream side to a sampling inlet; a sampling device is downstream of the sampling inlet to receive the mixture from the subsea chamber; and the sampling device is in series with the injection outlet on the same flowpath.

* * * * *